United States Patent
Harada et al.

(10) Patent No.: US 8,425,805 B2
(45) Date of Patent: Apr. 23, 2013

(54) CONDUCTIVE POLYMER FILM, ELECTRONIC DEVICE, AND METHODS OF PRODUCING THE FILM AND THE DEVICE

(75) Inventors: Gaku Harada, Kawanishi (JP); Takeshi Sano, Takatsuki (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 395 days.

(21) Appl. No.: 12/715,785

(22) Filed: Mar. 2, 2010

(65) Prior Publication Data
US 2010/0232090 A1 Sep. 16, 2010

(30) Foreign Application Priority Data

Mar. 12, 2009 (JP) ................. 2009-060109
Aug. 31, 2009 (JP) ................. 2009-199999
Feb. 10, 2010 (JP) ................. 2010-027110

(51) Int. Cl.
- *H01B 1/00* (2006.01)
- *C08G 75/00* (2006.01)
- *C08G 73/00* (2006.01)
- *C08G 73/06* (2006.01)
- *H01G 9/00* (2006.01)

(52) U.S. Cl.
USPC .......... 252/500; 528/373; 528/422; 528/423; 361/523

(58) Field of Classification Search ....... 252/500–521.6; 528/377, 422, 423; 361/523
See application file for complete search history.

(56) References Cited

U.S. PATENT DOCUMENTS

| | | | |
|---|---|---|---|
| 5,766,515 A | 6/1998 | Jonas et al. | |
| 6,083,635 A | 7/2000 | Jonas et al. | |
| 2006/0047030 A1* | 3/2006 | Yoshida et al. | 524/99 |
| 2009/0244027 A1 | 10/2009 | Yoshida et al. | |
| 2009/0320254 A1* | 12/2009 | Yoshimitsu | 29/25.03 |

FOREIGN PATENT DOCUMENTS

| | | |
|---|---|---|
| JP | 2000-336154 A | 12/2000 |
| JP | 2004-107552 A | 4/2004 |
| JP | 2005-263873 A | 9/2005 |
| JP | 2005-268341 A | 9/2005 |
| JP | 2005-332754 A | 12/2005 |
| JP | 2008-034440 A | 2/2008 |
| JP | 2008-171761 A | 7/2008 |
| JP | 2008-288342 A | 11/2008 |
| JP | 2009-054925 A | 3/2009 |

OTHER PUBLICATIONS

Yung-Hoon Ha et al., Towards a Transparent, Highly Conductive Poly(3,4-ethylenedioxythiophene), Advanced Functional Materials, No. 14, 2004, pp. 615-622.

* cited by examiner

*Primary Examiner* — Mark Kopec
*Assistant Examiner* — Jaison Thomas
(74) *Attorney, Agent, or Firm* — Marvin A. Motsenbocker; Mots Law, PLLC

(57) ABSTRACT

To provide a conductive polymer film and to improve the conductivity of the conductive polymer film used in an electronic device such as a solid electrolytic capacitor, the conductive polymer film is a conductive polymer film formed by using a polymerization liquid containing a monomer for a conductive polymer, an oxidant, and an additive. A salt formed of a dopant and a basic substance is used as the additive.

11 Claims, 6 Drawing Sheets

CONDUCTIVE POLYMER FILM, ELECTRONIC DEVICE, AND METHODS OF PRODUCING THE FILM AND THE DEVICE

BACKGROUND OF THE INVENTION

1. Field of the Invention

The present invention relates to a conductive polymer film and a method of producing the film, and an electronic device using the conductive polymer film and a method of producing the device.

2. Description of the Related Art

Conductive polymers each have characteristics such as excellent flexibility and an excellent lightweight characteristic while having metallic electronic conductivity or semiconductivity.

The conductive polymers have been conventionally used in the fields of, for example, antistatic materials, cathode materials for solid electrolytic capacitors, electromagnetic wave-shielding materials, transparent electrode materials, and antirust materials by taking advantage of their characteristics. In addition, research has been conducted on the application of the polymers to conductive film materials for use in electronic devices such as solid electrolytic capacitors, organic electroluminescent devices, actuators, transistors, solar cells, touch panels, and various sensors.

It has been known that, in the case of, for example, a solid electrolytic capacitor, an increase in conductivity of a conductive polymer film to be used as its cathode can reduce an equivalent series resistance (hereinafter referred to as "ESR") as an important value for evaluating the solid electrolytic capacitor for its characteristic. Research and development toward an increase in conductivity of the conductive polymer film have been advanced because the conductivity of the conductive polymer film serves as an important factor for the performance of such electronic device.

In recent years, investigation has been conducted on the introduction of various additives to a conductive polymer as an approach to increasing the conductivity of the conductive polymer film. To be specific, various proposals have been made on the use of, firstly, an "organic solvent", secondly, a "basic compound", and thirdly, an "acid substance" as such additives, and the solvent, the compound, and the substance are introduced below.

With regard to the "organic solvent" as the first additive, for example, the addition of an organic solvent such as N-methylpyrrolidone or ethylene glycol to a conductive polymer formed of a polythiophene and a polyanion has been proposed (Japanese Patent No. 2916098). With regard to the "basic compound" as the second additive, for example, the addition of a basic conductivity improver to a conductive polymer formed of a conductive polymer and a polyanion has been proposed (Japanese Patent Application Laid-Open No. 2007-95506). In addition, it has been proposed that a basic conductivity improver is added to a monomer for a conductive polymer and the mixture is subjected to oxidative polymerization (Japanese Patent Application Laid-Open No. 2008-171761 and Advanced Functional Materials 2004, 14, P615). With regard to the "acid substance" as the third additive, it has been proposed that an acid additive such as p-toluenesulfonic acid or an aromatic dicarboxylic acid is added to a monomer for a conductive polymer and the mixture is subjected to oxidative polymerization (Japanese Patent Application Laid-Open No. 2009-107552 and Japanese Patent Application Laid-Open. No. 2008-34440).

SUMMARY OF THE INVENTION

The conductivity $\sigma$ of a conductive polymer is represented by an equation "$\sigma = en\mu$." It should be noted that, in the equation, e represents an elementary electric charge, n represents a carrier density, and $\mu$ represents a mobility. Therefore, as can be seen from the equation for the conductivity $\sigma$, increasing the carrier density n and the mobility $\mu$ can increase the conductivity $\sigma$. The inventors of the present invention have found that an increase in doping amount is important in increasing the carrier density n and an improvement in orientation of the conductive polymer is important in increasing the mobility $\mu$.

In view of such finding, Japanese Patent No. 2916098 and Japanese Patent Application Laid-Open No. 2007-95506 each involve such inconvenience that the orientation of the conductive polymer cannot be improved because the conductive polymer is formed before a treatment with the additive is performed. In addition, Japanese Patent Application Laid-Open No. 2004-107552 and Japanese Patent Application Laid-Open No. 2008-34940 each involve such inconvenience that the addition of an additive having a small hydrogen ion exponent (hereinafter referred to as "pH"), i.e., an acid additive to the monomer for a conductive polymer reduces the orientation of a conductive polymer film to be obtained because reducing the pH of an oxidative polymerization liquid generally increases a reaction rate. As described above, a reduction in orientation of a conductive polymer inconveniently leads to a reduction in conductivity because carriers in the conductive polymer cannot efficiently transfer in or between molecular chains. In each of Japanese Patent Application Laid-Open No. 2008-171761 and Advanced Functional Materials 2004, 19, P615, the addition of the basic additive suppresses a polymerization rate, and hence the acquisition of a conductive polymer film having high orientation can be expected. However, the addition of a basic material slows the reaction rate of a polymerization reaction, and hence it becomes difficult to obtain a conductive polymer film having a sufficient thickness. Eventually, such inconvenience that the conductivity of the conductive polymer film reduces arises.

The present invention has been made in view of the above circumstances, and an object of the present invention is to improve the conductivity of a conductive polymer film and to improve the performance of an electronic device using the conductive polymer film with its conductivity improved.

A first conductive polymer film of the present invention obtained by polymerizing a monomer for a conductive polymer with a polymerization liquid containing the monomer for a conductive polymer, an oxidant, and an additive, in which the additive includes a salt formed of a dopant and a basic substance.

As in the case of the above constitution, the incorporation of the additive into the polymerization liquid suppresses the reaction rate of the conductive polymer, and hence can improve the doping ratio and orientation of the conductive polymer. As a result, the conductivity of the conductive polymer film can be increased. In addition, the oxidizing ability of the oxidant is not reduced because the salt is used. As a result, a conductive polymer film having a sufficient thickness can be obtained.

A salt represented by the following general formula (1) can be used as the additive.

$$A^-\cdot B^+ \qquad (1)$$

In the formula (1), A represents the dopant used in the conductive polymer and B represents the basic substance. The salt represented by the formula is such that the dopant A and the basic substance B are ionically bonded to each other.

The dopant A in this case is a material functioning as a dopant to be used in the conductive polymer, and preferably shows acidity. From such viewpoint, the dopant A preferably has a sulfone group, a carboxylate group, a phosphate group, or a phosphonate group, and the dopant is more preferably such a compound that any such functional group is bonded to benzene or naphthalene.

The basic substance B in this case preferably shows basicity. Examples of the basic substance B showing basicity include a nitrogen-containing, aromatic heterocyclic compound, a compound having an amide group, and a compound having an imide group.

Further, a second conductive polymer film of the present invention includes a polythiophene containing a sulfonic acid, in which a doping ratio of the sulfonic acid with respect to thiophene rings in the conductive polymer film is 0.55 or more and 0.72 or less. The doping ratio in this case represents the ratio at which the sulfonic acid as a dopant is incorporated per thiophene ring in the conductive polymer film. In other words, the higher the doping ratio, the larger the content of the sulfonic acid. In addition, the doping ratio was calculated from an area ratio between a sulfur atom peak derived from a thiophene ring and an SOx peak derived from the sulfonic acid as a dopant with an X-ray photoelectron spectrometer (XPS). A specific example of a method of determining the area ratio is described later.

As in the case of the above constitution, setting the doping ratio in the conductive polymer film to 0.55 or more and 0.72 or less increases the content of the sulfonic acid as a dopant and a carrier density. As a result, the conductivity of the conductive polymer film can be increased.

An electronic device of the present invention is characterized by using the above first or second conductive polymer film of the present invention. Examples of the electronic device of the present invention include a solid electrolytic capacitor, an organic solar cell, an organic electroluminescence device, an organic transistor, a touch panel, and a cell. For example, the conductive polymer film can be used in each of conductive films functioning as various electrodes in those electronic devices. As described above, the use of such conductive polymer film of the present invention as described above as a conductive film in an electronic device can provide an electronic device having a conductive polymer film excellent in conductivity.

The electronic device of the present invention may be a solid electrolytic capacitor. The solid electrolytic capacitor is provided with, for example, an anode, a dielectric layer formed on the surface of the anode, a conductive polymer layer formed on the dielectric layer, and a cathode layer formed on the conductive polymer layer, and the conductive polymer film is used in the conductive polymer layer. In the case of such solid electrolytic capacitor, the use of the conductive polymer film excellent in conductivity as the conductive polymer layer contributes to a reduction in equivalent series resistance (ESR).

A method of producing a conductive polymer film of the present invention includes: applying, onto a substrate, a polymerization liquid containing a monomer for a conductive polymer, an oxidant, and an additive as a salt in which a basic substance is bonded to a dopant; and polymerizing the monomer for a conductive polymer on the substrate.

According to the present invention, the conductive polymer film of the present invention can be obtained on a substrate by, for example, polymerizing the monomer for a conductive polymer on the substrate with the polymerization liquid.

A method of producing an electronic device of the present invention includes, when forming a conductive polymer film: applying, onto a substrate, a polymerization liquid containing a monomer for a conductive polymer, an oxidant, and an additive as a salt formed of a dopant and a basic substance; and polymerizing the monomer for a conductive polymer.

According to the present invention, a solid electrolytic capacitor including a conductive polymer film having a high conductivity can be obtained by, for example, applying the polymerization liquid onto the dielectric layer of a solid electrolytic capacitor and polymerizing the monomer for a conductive polymer.

It should be noted that, in the present invention, the monomer for a conductive polymer is not limited to one kind, and multiple kinds of monomers for a conductive polymer can also be used. In this case, a conductive polymer film formed of a copolymer can be obtained.

According to the present invention, a conductive polymer film excellent in conductivity can be obtained, and an electronic device including the conductive polymer film excellent in conductivity can be obtained. When the electronic device of the present invention is a solid electrolytic capacitor, the ESR of the solid electrolytic capacitor can be reduced because the above conductive polymer film of the present invention is used in a conductive polymer layer formed on a dielectric layer.

DETAILED DESCRIPTION OF THE PREFERRED EMBODIMENTS

Figure 1:
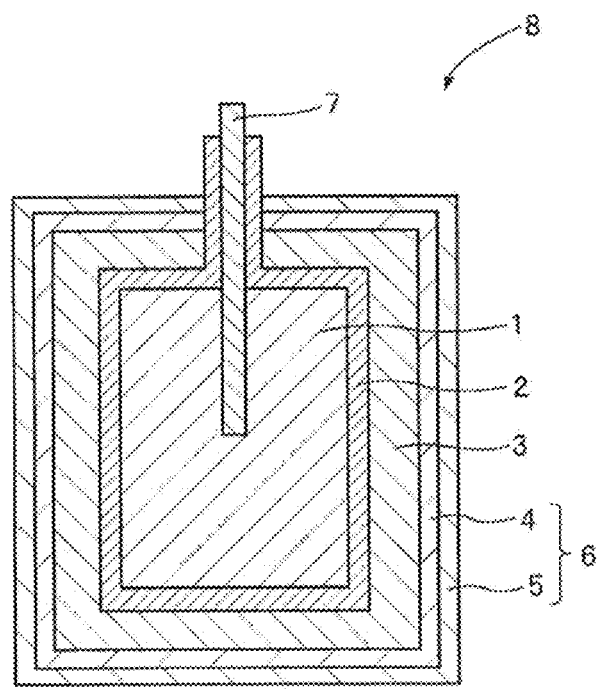
FIG. 1 is a schematic sectional view illustrating a solid electrolytic capacitor as an embodiment of an electronic device of the present invention.

Hereinafter, an embodiment of a conductive polymer film of the present invention is described in detail.

The conductive polymer film of this embodiment is obtained by polymerizing a monomer for a conductive polymer, and is characterized in that a salt in which a dopant A and a basic substance B are ionically bonded to each other is added as an additive to a polymerization liquid for the film together with an oxidant. The incorporation of the additive into the polymerization liquid as described above suppresses the reaction rate of the conductive polymer, and hence can improve the doping ratio and orientation of the conductive polymer. As a result, the conductivity of the conductive polymer film can be increased.

The above additive is a salt represented by the general formula (1), and a salt represented by the following formula (2) can be more preferably used.

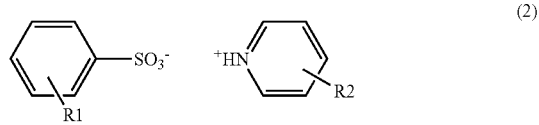

(2)

In the above formula (2), R1 and R2 each represent, for example, an alkyl group represented by $C_nH_{(2n+1)}$, an alkoxy group represented by $C_nH_{(2n+1)}O$, a carboxylate group, a hydroxy group, an amino group, a nitro group, an allyl group, or an aryl group.

In the above formula (2), each of the benzene ring and pyridine ring is not limited to monosubstituted bodies having one R1 or R2, and may be multi-substituted bodies having a plurality of R1 or R2. When the benzene ring and pyridine ring are multi-substituted bodies, the respective substituents may be identical to each other, or may be different from each other.

To be specific, in this embodiment, pyridinium p-toluenesulfonate was used as the above additive.

In addition, the additive used in this embodiment is a salt represented by the general formula (1), and hence the additive may have a function of stabilizing a pH in the polymerization liquid by virtue of such a buffer effect as described later. As a result, the reaction rate of the conductive polymer can be constantly kept in a state of being suppressed. Therefore, the doping ratio and orientation of the conductive polymer can be improved, and hence the conductivity of the conductive polymer film can be increased. Further, the additive does not react with an acid oxidant because the additive is a salt represented by the general formula (1). As a result, the oxidizing ability of the oxidant is maintained, and hence a conductive polymer film having such a practical thickness as to be usable in an electronic device can be easily obtained. Therefore, the additive has not only a suppressing action on the reaction rate but also a stabilizing action on the reaction rate. An improvement in conductivity of the conductive polymer film results from the action of the additive, that is, such improving action on the orientation of the conductive polymer film as described above. Such improving action on the orientation improves the crystallinity and denseness of the conductive polymer film. As a result, the conductivity of the conductive polymer film may be improved.

Next, an influence of the oxidant in the polymerization liquid for obtaining the conductive polymer film is described.

For example, when the conductive polymer film is formed by polymerizing a polymerizable monomer such as polyethylenedioxythiophene (hereinafter referred to as "PEDOT") by chemical polymerization, the smaller the pH of the polymerization liquid, the higher the polymerization rate. As a result, the film quality and orientation of 2EDOT reduce, and hence the conductivity of the conductive polymer film reduces. Therefore, when ferric p-toluenesulfonate is used as the oxidant added to the polymerization liquid, the oxidant is reduced by a reaction between the oxidant and the monomer, and hence iron p-toluenesulfonate and p-toluenesulfonic acid are obtained. In this case, part of the molecules of p-toluenesulfonic acid as a reaction by-product are included as a dopant for the conductive polymer. However, the other molecules remain in the reaction solution. In addition, as the polymerization reaction proceeds, the pH of the polymerization liquid reduces in association with an increase in its acidity. As a result, the polymerization rate increases along with the polymerization reaction, and hence a conductive polymer film having low orientation is produced.

An additive has been conventionally used for improving the conductivity of a conductive polymer. However, a basic substance such as pyridine or imidazole is added, and hence the following inconvenience arises. That is, ferric p-toluenesulfonate as an acid oxidant and pyridine or imidazole as a basic additive react with each other, and hence the oxidizing action of the oxidant itself reduces. In addition, the pH of a polymerization liquid increases owing to the addition of the basic substance, thereby suppressing the reaction rate. Therefore, the following situation is conceivable. That is, as the polymerization reaction proceeds as described above, p-toluenesulfonic acid is produced, and the pH of the polymerization liquid reduces, and further, as the polymerization reaction proceeds, the disturbance of the orientation of the conductive polymer film proceeds. As a result, increasing the addition amount of the additive reduces the oxidizing ability of ferric p-toluenesulfonate as the oxidant so that the polymerization reaction may hardly occur. Accordingly, a conductive polymer film having a sufficient thickness can no longer be obtained.

Such effect of the additive on the influence of the oxidant as described above is described below.

As described below, the additive used in this embodiment can be considered to have a reaction-suppressing effect, a buffer effect by which the pH is kept constant, or an increasing effect on the doping ratio of the dopant.

The reaction-suppressing effect of the additive can be understood as such an effect that the decrement of the thickness of the conductive polymer film obtained by polymerization increases as compared to the decrement of a monomer concentration caused by the addition of the additive and hence the polymerization reaction is suppressed. Suppressing the polymerization reaction as described above improves the orientation, or crystallinity of the conductive polymer film and the denseness of the film.

In addition, the effect by which the pH is kept constant is understood as the same effect as the buffer action. For example, as in the case of the foregoing, a polymerization reaction between ethylenedioxythiophene (EDOT) and ferric p-toluenesulfonate as the oxidant produces a p-toluenesulfonate anion and a hydrogen ion. When pyridinium p-toluenesulfonate as the additive is added to the polymerization liquid in advance, pyridinium p-toluenesulfonate dissociates into a p-toluenesulfonate anion and a pyridine cation, and hence a state where a large amount of the p-toluenesulfonate anion is present in the polymerization liquid is established. The p-toluenesulfonate anion and the hydrogen ion produced by the polymerization reaction are present as p-toluenesulfonic acid by virtue of an equilibrium reaction. As a result, a fluctuation in pH of the polymerization liquid can be suppressed. Suppressing the fluctuation in pH keeps the reaction rate constant, and hence an optimum condition for the polymerization reaction can be maintained. As a result, the orientation, or crystallinity of the conductive polymer film and the denseness of the film are maintained in the entire film, and hence the conductivity is improved.

Further, the increasing effect on the doping ratio is as described below. The additive dissociates into the dopant and the basic substance in the polymerization liquid, and the basic substance acts on the oxidant to suppress the polymerization rate. On the other hand, the dopant is present in the polymerization liquid to promote doping. As a result, the increasing effect on the doping ratio is exerted. The effect cannot be obtained by adding the salt containing the dopant after the polymerization, and as described above, it is important that the dopant in the salt be present during the polymerization reaction.

In contrast, when the monomer is polymerized by adding a basic substance such as pyridine or imidazole which has been conventionally used as an additive, the polymerization reaction is suppressed as described above, and hence the production of a dopant such as p-toluenesulfonic acid as a reaction by-product is also suppressed. As a result, it has been difficult to significantly increase a doping ratio in a conductive polymer film obtained by polymerization with the conventional additive.

The content of the additive in the polymerization liquid for the conductive polymer preferably falls within the range of 0.1 mol to 3 mol with respect to 1 mol of the oxidant. In this case, additionally excellent conductivity is obtained.

The content of the additive in the polymerization liquid for the conductive polymer more preferably falls within the range of 0.1 mol to 1.5 mol with respect to 1 mol of the oxidant. When the content of the additive is excessively small, excellent conductivity cannot be sufficiently obtained in some cases. In addition, when the content of the additive is excessively large, the conductivity may reduce. The content of the additive falls within the range of more preferably 0.2 mol to 1.5 mol, or still more preferably 0.3 mol to 1.4 mol. The content of the additive still more preferably falls within the range of 0.75 mol to 1.2 mol.

Hereinafter, the respective constitutions of the conductive polymer film in this embodiment are sequentially described.

<Monomer for Conductive Polymer>

Examples of the monomer for a conductive polymer include pyrrole, thiophene, aniline, and their derivatives. A π-conjugated conductive polymer having a repeating unit of the monomer can be obtained by the polymerization of the monomer. Therefore, the use of the above monomer can provide a conductive polymer formed of, for example, any one of the polypyrroles, the polythiophenes, the polyanilines, and their copolymers. Although the n-conjugated conductive polymer can obtain sufficient conductivity even when the polymer remains unsubstituted, a functional group such as an alkyl group, a carboxylate group, a sulfonate group, an alkoxyl group, a hydroxyl group, or a cyano group is preferably introduced into the n-conjugated conductive polymer for additionally improving the conductivity.

Specific examples of such n-conjugated conductive polymer include: polypyrroles such as polypyrrole, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), and poly(3,4-ethylenedioxypyrrole); polythiophenes such as polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), and poly(3-methyl-4-carboxybutylthiophene); and polyanilines such as polyaniline poly(2-methylaniline), poly(3-isobutylaniline), poly(2-anilinesulfonic acid), and poly(3-anilinesulfonic acid). Of those, in terms of a conductivity, suitably used is a polymer or a copolymer formed of one kind or two or more kinds selected from polypyrrole, polythiophene, poly(N-methylpyrrole), poly(3-methylthiophene), poly(3-methoxythiophene), and poly(3,4-ethylenedioxythiophene). Further, more preferred are polypyrrole and poly(3,4-ethylenedioxythiophene) because heat resistance as well as conductivity can be improved.

<Oxidant>

The oxidant is used as a polymerization initiator for the monomer for a conductive polymer. Examples of such oxidant include: transition metal compounds such as ferric sulfate and ferric nitrate; and transition metal salts of organic sulfonic acids such as iron p-toluenesulfonate.

<Additive>

The additive, which is a salt represented by the general formula (1), i.e., a salt in which the dopant A and the basic substance B are ionically bonded to each other, is a basic substance. The dopant A of which the salt is constituted preferably shows acidity. The dopant A preferably has a sulfone group, a carboxylate group, a phosphate group, or a phosphonate group, or is more preferably a compound in which any such functional group is banded to benzene or naphthalene.

In addition, the basic substance B preferably shows basicity. Examples of the basic substance B include a nitrogen-containing, aromatic heterocyclic compound, a compound having an amide group, a compound having an imide group, and a compound having an amino group. One kind of those additives may be used alone, or multiple kinds of them may be used in combination. Examples of the basic substance B that is a nitrogen-containing, aromatic heterocyclic compound include: pyridines each containing one nitrogen atom and their derivatives; imidazoles each containing two nitrogen atoms and their derivatives; pyrimidines and their derivatives; pyrazines and their derivatives; and triazines each containing three nitrogen atoms and their derivatives. From the viewpoint of solvent solubility, the basic substance B is preferably any one of the pyridines and their derivatives, the imidazoles and their derivatives, and the pyrimidines and their derivatives.

Specific examples of pyridines and derivatives thereof include pyridine, 2-methylpyridine, 3-methylpyridine, 4-methylpyridine, 4-ethylpyridine, 3-butylpyridine, 4-tert-butylpyridine, 2-butoxypyridine, 2,4-dimethylpyridine, 2-fluoropyridine, 2,6-difluoropyridine, 2,3,5,6-tetrafluoropyridine, 2-vinylpyridine, 4-vinylpyridine, 2-methyl-6-vinylpyridine, 5-methyl-2-vinylpyridine, 4-butenylpyridine, 4-pentenylpyridine, 2,4,6-trimethylpyridine, 3-cyano-5-methylpyridine, 2-pyridinecarboxylic acid, 6-methyl-2-pyridinecarboxylic acid, 2,6-pyridinedicarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 2,6-dihydroxypyridine, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Specific examples of imidazoles and derivatives thereof include imidazole, 2-methylimidazole, 2-ethylimidazole, 2-propylimidazole, 2-isopropylimidazole, 2-butylimidazole, 2-undecylimidazole, 2-heptadecylimidazole, 2-phenylimidazole, N-methylimidazole, N-vinylimidazole, N-allylimidazole, 2-methyl-4-vinylimidazole, 2-methyl-1-vinylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, 2-(2-pyridyl)benzimidazole, 2-nonylimidazole, and carbonyldiimidazole.

Specific examples of pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Specific examples of pyrazines and derivatives thereof include pyrazine, 2-methylpyrazine, 2,5-dimethylpyrazine, pyrazinecarboxylic acid, 2,3-pyrazinecarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2-ethyl-3-methylpyrazine, 2,3-dimethylpyrazine, and 2,3-diethylpyrazine.

Specific examples of triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, disodium 3-(2-pyridine)-5,6-bis(4-phenylsulfonic acid)-1,2,4-triazine, 3-(2-pyridine)-5,6-diphenyl-1,2,4-triazine, and 2-hydroxy-4,6-dichloro-1,3,5-triazine.

Specific examples of other nitrogen-containing aromatic heterocyclic compounds include indole, 1,2,3-benzotriazole, and 1H-benzotriazole-1-methanol.

Further, specific examples of the salt as an additive include pyridinium p-toluenesulfonate, pyridinium dodecylbenzenesulfonate, pyridinium p-toluenesulfonate, pyridinium mesitylenesulfonate, pyridinium naphthalenesulfonate, pyridinium butylnaphthalenesulfonate, pyridinium anthraquinonesulfonate, 2-aminoethanethiol p-toluenesulfonate, aminomalononitrile p-toluenesulfonate, phenylalanine benzyl ester p-toluenesulfonate, 2,6-dimethylpyridinium p-toluenesulfonate, 2,4,6-trimethylpyridinium p-toluenesulfonate, 2-chloro-1-methylpyridine p-toluenesulfonate, 2-fluoro-1-methylpyridine p-toluenesulfonate, pyridinium-3-nitrobenzenesulfonate, 1-cyclohexyl-3-(2-morpholinoethyl)carbodiimide metho p-toluenesulfonate, glycine benzyl ester p-toluenesulfonate, 6-aminohexanoic acid hexyl ester p-toluenesulfonate, β-alanine benzyl ester p-toluenesulfonate, D-alanine benzyl ester p-toluenesulfonate, D-leucine benzyl ester p-toluenesulfonate, D-valine benzyl ester p-toluenesulfonate, L-alanine benzyl ester p-toluenesulfonate, L-leucine benzyl ester p-toluenesulfonate, L-tyrosine benzyl ester p-toluenesulfonate, propionyl p-toluenesulfonate, tetramethylammonium p-toluenesulfonate, tetraethylammonium p-toluenesulfonate, tosufloxacin p-toluenesulfonate, an imidazolium salt, a pyrrolidinium salt, a pyridinium salt, an ammonium salt, a phosphonium salt, and a sulfonium salt.

The content of any such additive as described above in the polymerization liquid falls within the range of preferably 0.1 to 10 mol, more preferably 0.1 to 2 mol, or still more preferably 0.5 to 1 mol with respect to 1 mol of the oxidant. When the content of the conductivity improver is excessively small, an effect of the conductivity improver reduces, and hence the conductivity tends to reduce. In addition, when the content of the conductivity improver is excessively large, a polymerization-suppressing effect enlarges. As a result, the conductive polymer film becomes thin, and hence it tends to be difficult to obtain a sufficient thickness.

<Substrate and Conductive Polymer Film>

Because a base body serving as a ground on which the conductive polymer film is formed is called a substrate, in, for example, an electronic device having the conductive polymer film, a ground film on which the conductive polymer film is formed corresponds to the substrate. To be specific, in the case of a solid electrolytic capacitor to be described later, a dielectric layer corresponds to the substrate.

A method of forming the conductive polymer film on the substrate involves applying, onto the substrate, the polymerization liquid containing the monomer for a conductive polymer, the oxidant, and the additive, and polymerizing the monomer for a conductive polymer in the polymerization liquid. That is, the conductive polymer film is such that the monomer for a conductive polymer is polymerized on the substrate, and has improved adhesiveness to the substrate, a reduced contact resistance, and an increased ESR as compared to those of a conductive polymer film obtained through application onto the substrate after the polymerization of the monomer for a conductive polymer. A method of applying the polymerization solution to a substrate is not particularly limited, and examples thereof include a spin coating method, a dip method, a drop cast method, an ink-jet method, a spray method, a screen printing method, a gravure printing method, and a flexo printing method.

Hereinafter, an embodiment of a solid electrolytic capacitor using the conductive polymer film is described.

<Solid Electrolytic Capacitor>

FIG. 1 is a schematic sectional view illustrating a solid electrolytic capacitor as an embodiment according to the present invention. As illustrated in FIG. 1, one terminal of an anode lead 7 is embedded in an anode 1. The anode 1 is produced by molding a powder formed of a valve metal or of an alloy mainly formed of the valve metal, and sintering the molded body. Therefore, the anode 1 is formed of a porous body. Although not illustrated in FIG. 1, a large number of fine holes are formed in the porous body so as to communicate from the inside of the body to the outside. The anode 1 thus produced is produced so that its external shape may be substantially a rectangular parallelopiped in this embodiment.

Examples of the valve metal include tantalum, niobium, titanium, aluminum, hafnium, and zirconium. Of those, particularly preferred are tantalum, niobium, aluminum, and titanium of which an oxide as a dielectric substance is relatively stable at high temperature. Examples of the alloy mainly formed of the valve metal include an alloy formed of two or more kinds of valve metals such as tantalum and niobium.

A dielectric layer 2 formed of an oxide obtained by the anodic oxidation of the anode 1 is formed on the surface of the anode 1. The dielectric layer 2 is formed on the surfaces of the holes of the anode 1 as well. In FIG. 1, the dielectric layer 2 formed on the outer peripheral side of the anode 1 is schematically illustrated, and the illustration of the dielectric layer formed on the wall surfaces of the above holes of the porous body is omitted. The dielectric layer 2 can be formed by the anodic oxidation of the surface of the anode 1. A conductive polymer layer 3 is formed so as to cover the surface of the dielectric layer 2.

The conductive polymer layer 3 is formed so as to cover the dielectric layer 2, and can be constituted of the conductive polymer film.

The conductive polymer film used in the conductive polymer layer 3 in a solid electrolytic capacitor 8 is a conductive polymer film obtained by polymerizing the monomer for a conductive polymer as described above with a polymerization liquid containing the monomer for a conductive polymer, the oxidant as described above, and the additive as described above as a salt formed of the dopant and the basic substance. It should be noted that a polymerization process for forming the conductive polymer layer 3 is described later.

Although the conductive polymer layer 3 is of a single-layer structure in FIG. 1, when the layer is of a multi-layer structure, the above conductive polymer film has only to be formed in at least part of the structure, that is, in one layer of the structure. For example, when the conductive polymer layer 3 obtained by laminating conductive polymer films having different conductivities so that a conductivity on a cathode side to be described later may be higher than that on the anode side is used, the above conductive polymer film can be used in the conductive polymer layer on the cathode side.

Although not illustrated in FIG. 1, the conductive polymer layer 3 is formed on the dielectric layer 2 on the wall surfaces of the holes of the anode 1 as well. In addition, further, the conductive polymer layer 3 is formed on the outer peripheral surface of the anode 1 as well. A carbon layer 4 is formed on the conductive polymer layer 3 at that portion, and a silver paste layer 5 is formed on the carbon layer 4.

A cathode layer 6 is constituted of two layers, i.e., the carbon layer 4 and the silver paste layer 5. The carbon layer 4 can be formed by applying a carbon paste, and drying the applied paste. The silver paste layer 5 can be formed by applying a silver paste to the carbon layer 4, and drying the applied paste. The solid electrolytic capacitor 8 of this embodiment is constituted as described above.

The periphery of the solid electrolytic capacitor 8 is covered with a molded exterior resin. An anode terminal is connected to the anode lead 7. A cathode terminal is connected to the cathode layer 6. Each terminal is pulled out of the molded exterior resin.

In the solid electrolytic capacitor 8 of this embodiment, the conductive polymer film is used in at least part of the conductive polymer layer 3, and hence the conductive polymer layer 3 excellent in conductivity can be formed. Therefore, in such solid electrolytic capacitor of this embodiment, the above conductive polymer film is used in at least part of the conductive polymer layer 3, and hence the ESR of the solid electrolytic capacitor 8 can be reduced.

<Organic Solar Cell>

Figure 2:
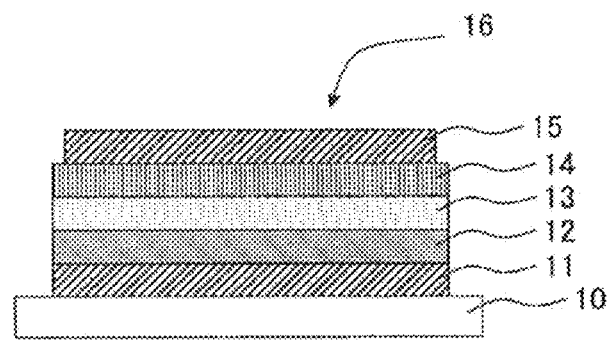
FIG. 2 is a schematic sectional view illustrating an organic solar cell as another embodiment of the electronic device of the present invention.

FIG. 2 is a schematic sectional view illustrating an organic solar cell as another embodiment of the device according to the present invention. As illustrated in FIG. 2, a transparent electrode 11 is formed on a substrate 10. A glass substrate can be used as the substrate 10. A thin film formed of, for example, an indium tin oxide (ITO) is used as the transparent electrode 11. A hole-transporting layer 12 is formed on the transparent electrode 11. Such conductive polymer film as described above can be used as the hole-transporting layer 12. An active layer 13 is formed on the hole-transporting layer 12. For example, a poly(3-hexylthiophene) film can be formed as the active layer 13. An electron-transporting layer 14 is formed on the active layer 13. For example, a $C_{60}$ fullerene film can be formed as the electron-transporting layer 14. An upper electrode 15 is formed on the electron-transporting layer 14. A metal film such as an aluminum film can be formed as the upper electrode 15. An organic solar cell 16 is constituted as described above.

In the organic solar cell 16 of this embodiment, the above conductive polymer film is formed as the hole-transporting layer 12, and hence the hole-transporting layer 12 is excellent in conductivity. As a result, in the organic solar cell, an IR drop resulting from an interface resistance and a bulk resistance can be reduced, and an open-circuit voltage can be increased.

<Silicon-Based Solar Cell>

Figure 3:
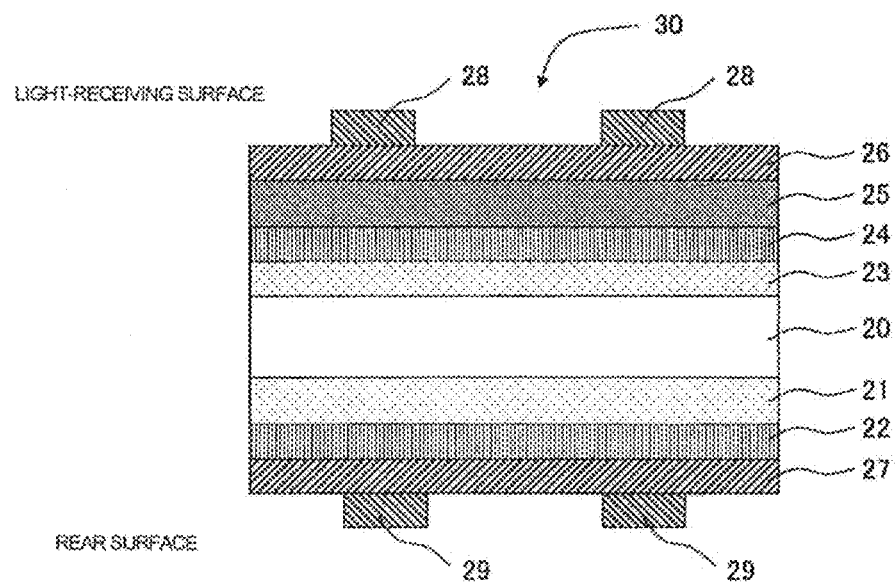
FIG. 3 is a schematic sectional view illustrating a silicon-based solar cell as another embodiment of the electronic device of the present invention.

FIG. 3 is a schematic sectional view illustrating a silicon-based solar cell 30 as another embodiment of the device according to the present invention. As illustrated in FIG. 3, an i-type amorphous silicon layer 21 and an n-type amorphous silicon layer 22 are formed in the stated order on the rear surface side of an n-type single-crystal silicon substrate 20 having a texture structure on its surface, and an i-type amorphous silicon layer 23 and a p-type amorphous silicon layer 24 are formed in the stated order on the light-receiving surface side of the substrate.

The above conductive polymer film 25 is formed as a transparent electrode on the p-type amorphous silicon layer 24 on the light-receiving surface side, and a buffer layer 26 is formed on the conductive polymer film 25. The buffer layer 26 can be formed of an indium tin oxide (ITO). In addition, a rear surface electrode layer 27 is formed on the n-type amorphous silicon layer 22 on the rear surface side. An indium tin oxide (ITO) can be used in the rear surface electrode layer 27. Light-receiving surface side collecting electrodes 28 are formed on the buffer layer 26 on the light-receiving surface side, and rear surface side collecting electrodes 29 are formed on the rear surface electrode layer 27. The silicon-based solar cell 30 as an embodiment of the present invention is constituted as described above.

In the silicon-based solar cell 30 of this embodiment, the above conductive polymer film is formed as the transparent electrode on the light-receiving surface side, and hence an electrode having a high light transmittance and excellent in conductivity can be formed. Because the conductivity of the transparent electrode on the light-receiving surface side can be improved as described above, in the silicon-based solar cell, a loss resulting from the resistance of the transparent electrode can be reduced, and conversion efficiency can be improved.

<Transparent Conductive Substrate>

Figure 4:
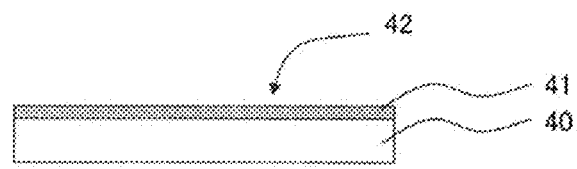
FIG. 4 is a schematic sectional view illustrating a transparent conductive substrate as another embodiment of the electronic device of the present invention.
Figure 9:
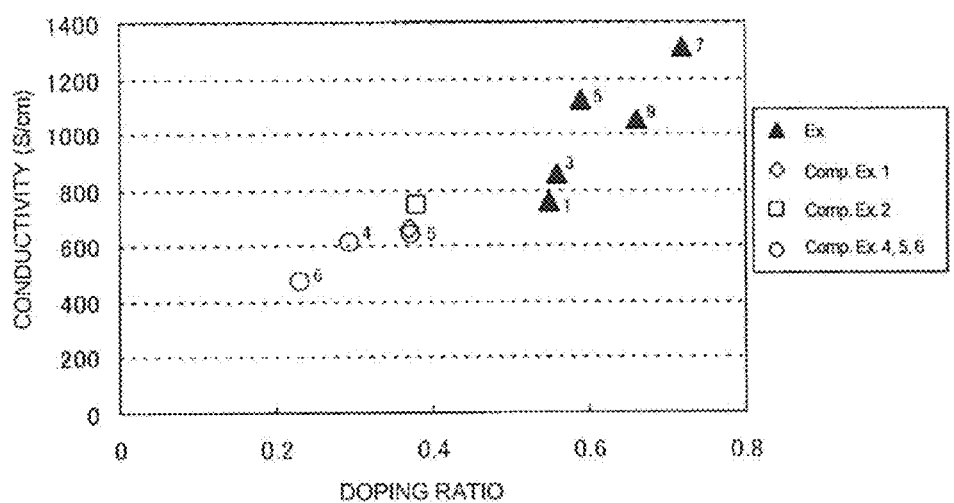
FIG. 9 is a view illustrating a relationship between the doping ratio and conductivity of each of the conductive polymer films formed on the glass substrates.

FIG. 4 is a schematic sectional view illustrating a transparent conductive substrate 42 as another embodiment of the device according to the present invention. As illustrated in FIG. 9, a conductive polymer film 41 is formed as a transparent conductive film on a substrate 40. A glass substrate or plastic substrate can be used as the substrate 40. Because the use of the above conductive polymer can improve the conductivity of the conductive polymer film 41, a transmittance can be increased while a small thickness and high conductivity are maintained. In addition, together with the increase in light transmittance by virtue of a reduction in thickness, an absorption coefficient can be reduced as described later, and hence the light transmittance can be further increased.

Figure 5:
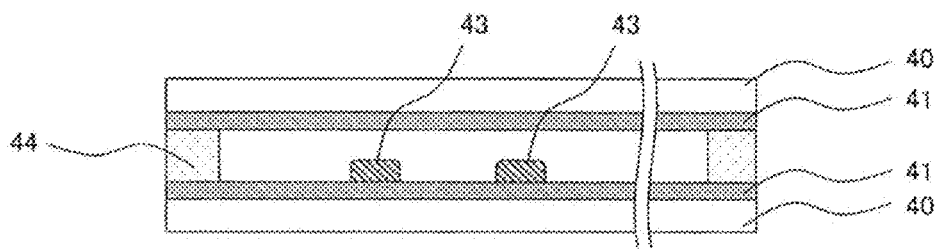
FIG. 5 is a schematic sectional view illustrating a touch panel as another embodiment of the electronic device of the present invention.

The above transparent conductive substrate 42 can be used in a touch panel or display. In the case of, for example, a resistance film-type touch panel, as illustrated in FIG. 5, two film substrates on each of which the conductive polymer film 41 is formed are placed so that the conductive polymer films 41 may face each other with a certain distance between them. The two film substrates are stuck to each other with a sticker 44. In the space between the conductive polymer films 41 facing each other, insulative dot spacers 43 are uniformly placed on the entire surface of one of the conductive polymer films 41 at a certain interval. As a result, the conductive polymer films 41 are prevented from contacting each other owing to the deflection of the film substrates 40. When a pen, finger, or the like is pressed against the film substrate 40 on the upper side, the conductive polymer films 41 contact each other between the dot spacers 43 at the position of the pressing owing to the pressing force. As a result, the upper and lower conductive polymer films 41 contact each other, and conduction is established. The position of a contact point is detected by detecting the resistance of one of the conductive polymer films 41 from an end of the touch panel to the contact point. In addition, the transparent conductive substrate 42 can be used as an electrode for organic electroluminescence, liquid crystal, or electronic paper in a display application.

EXAMPLES

Hereinafter, specific examples according to the present invention are described in detail. It should be noted that the present invention is not limited to the following examples.
<Conductive Polymer Film Formed on Glass Substrate>

Examples 1 to 10 and Comparative Example 1

First, 3,4-ethylenedioxythiophene as a monomer for a conductive polymer, a 40-wt % solution of ferric p-toluenesulfonate as an oxidant in butanol, and pyridinium p-toluenesulfonate as an additive that was a salt formed of a dopant and a basic substance were mixed at any one of the various predetermined molar ratios shown in Table 1 so that a polymerization liquid might be prepared. The resultant polymerization liquid was applied onto a glass substrate by a spin coating method so that a film might be formed. After the formation of the film from the polymerization liquid, the film was left to stand at 50° C. for 1 hour. After having been left to stand, the film was washed with pure water so that a by-product might be removed, and a conductive polymer film was formed on the glass substrate. Thus, conductive polymer films of Examples 1 to 10 were obtained.

Meanwhile, a conductive polymer film of Comparative Example 1 was obtained in the same manner as in Example 1 except that no additive was incorporated into the polymerization liquid.

Comparative Examples 2 and 3

Conductive polymer films of Comparative Examples 2 and 3 were each obtained by forming a conductive polymer film on a glass substrate in the same manner as in each of Examples 1 to 10 described above except that pyridine (not corresponding to the salt formed of the dopant and the basic substance) that had been conventionally known as a conductivity improver was added instead of the additive formed of pyridinium p-toluenesulfonate to a polymerization liquid at a ratio shown in Table 1, and the conductive polymer film was formed with the polymerization liquid.

Comparative Examples 4 to 6

Conductive polymer films of Comparative Examples 4 to 6 were each obtained by forming a conductive polymer film on a glass substrate in the same manner as in each of Examples 1 to 10 described above except that imidazole (not corresponding to the salt formed of the dopant and the basic substance) that had been conventionally known as a conductivity improver was added instead of the additive formed of pyridinium p-toluenesulfonate to a polymerization liquid at a ratio shown in Table 1, and the conductive polymer film was formed with the polymerization liquid.

The thickness of each of the resultant conductive polymer films was measured with a stylus-type surface shape-measuring machine Dektak, and the conductivity of each of the conductive polymer films was measured with a resistivity meter Loresta MC Para T610 (manufactured by Mitsubishi Chemical Analytech Co., Ltd.).

In addition, the doping ratio of the conductive polymer film was calculated for each of Examples 1, 3, 5, 7, and 9, and Comparative Examples 1, 2, 4, 5, and 6. The doping ratio is calculated from an area ratio between a sulfur atom peak derived from a thiophene ring and an SOx peak derived from p-toluenesulfonic acid as a dopant in the distribution of the count number of photoelectrons per unit time measured with an X-ray photoelectron spectrometer (XPS), and the doping ratio represents the content ratio of p-toluenesulfonic acid as a dopant.

Figure 6:
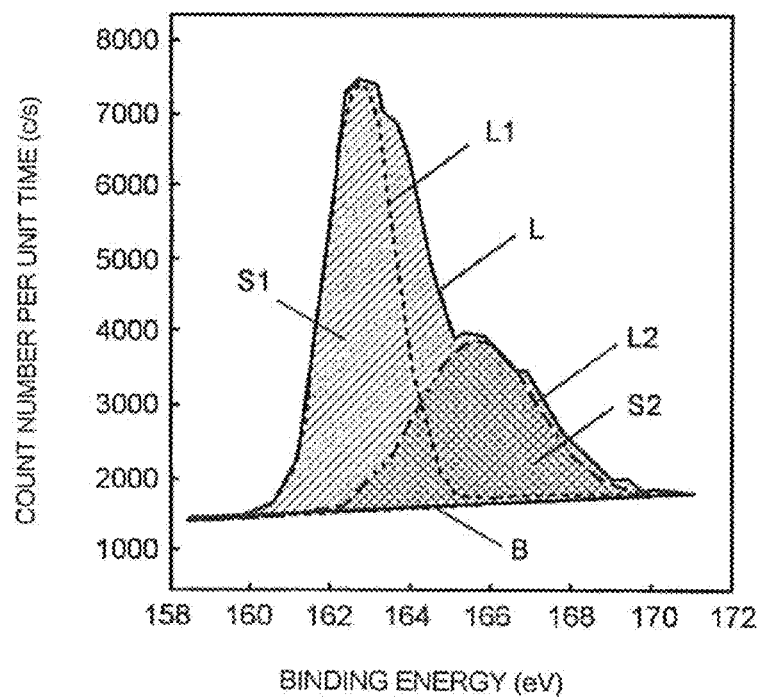
FIG. 6 is a view illustrating the distribution of the count number of photoelectrons per unit time with an X-ray photoelectron spectrometer (XPS)

To be specific, as illustrated in FIG. 6, a binding energy was indicated by an axis of abscissa and the count number of photoelectrons per unit time was indicated by an axis of ordinate. Then, the distribution obtained by the measurement (distribution represented by a solid line L of the figure) was separated into a distribution that peaked at about 163 eV corresponding to the sulfur atom peak derived from the thiophene ring (distribution represented by a broken line L1 of the figure) and a distribution that peaked at about 165 eV corresponding to the SOx peak derived from p-toluenesulfonic acid (distribution represented by a chain double-dashed line L2 of the figure) by a fitting treatment with an electronic computer. Next, an area (S1) above a background level (line B of the figure) was calculated for the distribution corresponding to the sulfur atom peak, and an area (S2) above the background level (line B of the figure) was calculated for the distribution corresponding to the SOx peak. A ratio (S2/S1) of the area (S2) for the distribution corresponding to the SOx peak to the area (S1) for the distribution corresponding to the sulfur atom peak was determined, and the ratio was defined as the doping ratio.

Further, the absorption coefficient of the conductive polymer film for light having a wavelength of 800 nm was measured for each of Examples 1 to 10, and Comparative Examples 1, 2, 4, 5, and 6, and the transmittance of the conductive polymer film when its thickness was 1000 Å was calculated from the absorption coefficient. To be specific, light was applied to the conductive polymer film, and an intensity R of reflected light and an intensity T of transmitted light were measured with a spectrophotometer U4100 (manufactured by Hitachi High-Technologies Corporation). Then, an intensity M of the applied light minus the intensity R of the reflected light and the intensity T of the transmitted light were compared, and the transmittance (T/(M−R)) of the conductive polymer film was determined. Then, the absorption coefficient was calculated from the following equation (2) together with the thickness of the conductive polymer film separately measured.

Absorption coefficient=−Log$_{10}$(transmittance)/thickness (2)

In addition, the transmittance of the conductive polymer film when its thickness was 1000 Å was determined by an inverse operation to the above equation (2) with the thickness set to 1000 Å.

Table 1 shows the results of the evaluation of Examples 1 to 10 and Comparative Examples 1 to 6 described above.

Figure 7:
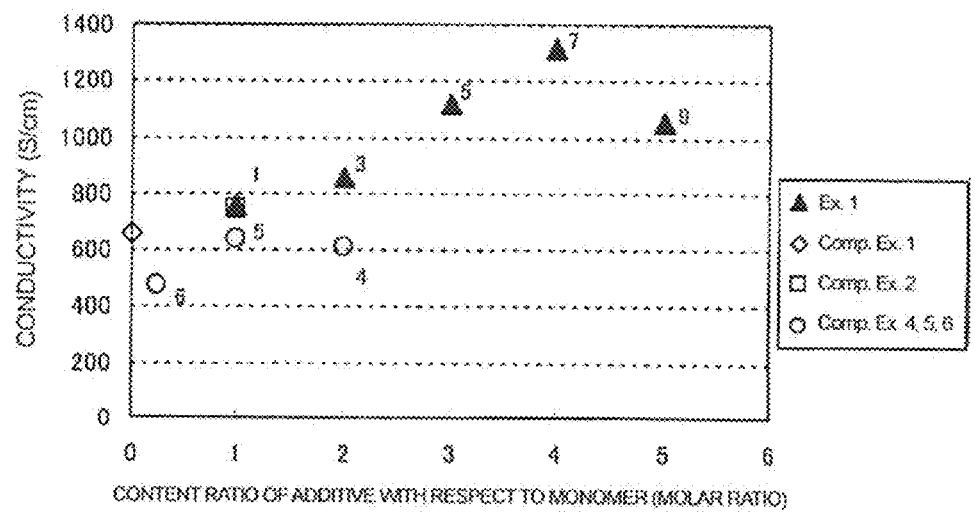
FIG. 7 is a view illustrating a relationship between the content ratio of an additive with respect to a monomer, and conductivity, of each of conductive polymer films formed on glass substrates.

FIG. 7 is a view illustrating a relationship between the content ratio of an additive with respect to a monomer, and conductivity, of each of the conductive polymer films of Examples 1, 3, 5, 7, and 9, and Comparative Examples 1, 2, 4, 5, and 6. The term "content ratio of an additive with respect to a monomer" as used herein refers to a molar ratio of the amount of an additive with respect to a monomer in the polymerization liquid. As illustrated in FIG. 7, the conductivity was not increased in Comparative Example 1 in which no additive was used and Comparative Examples 2, 4, 5, and 6 in each of which pyridine or imidazole was used as the additive even when the content ratio of the additive was increased. Comparative Example 2 provided the highest conductivity of about 740 S/cm, but a high conductivity of 750 S/cm (see Table 1) or more like each example could not be obtained.

Further, from FIG. 7, when the additive in each example was used, the content ratio of an additive with respect to a monomer of 2 to 5 provided a particularly high conductivity. In addition, the content ratio of an additive with respect to a

TABLE 1

| | Additive | Film-forming conditions (mol) | | | Conductivity (S/cm) | Thickness (μm) | Doping Ratio | Absorption Coefficient (cm−1) | Transmittance (%) |
|---|---|---|---|---|---|---|---|---|---|
| | | Monomer | Oxidant | Additive | | | | | |
| Comp. Ex. 1 | None | 1 | 4 | 0 | 657.7 | 0.23 | 0.37 | 39285 | 40.5 |
| Ex. 1 | Pyridinium | 1 | 4 | 1 | 756.4 | 0.21 | 0.55 | 37899 | 41.8 |
| Ex. 2 | p- | 1 | 4 | 1.5 | 819.3 | 0.19 | | 38168 | 41.5 |
| Ex. 3 | toluenesulfonate | 1 | 4 | 2 | 855.4 | 0.18 | 0.56 | 37069 | 42.6 |
| Ex. 4 | | 1 | 4 | 2.5 | 923 | 0.16 | | 36320 | 43.3 |
| Ex. 5 | | 1 | 4 | 3 | 1119 | 0.13 | 0.59 | 36355 | 43.3 |
| Ex. 6 | | 1 | 4 | 3.5 | 1223 | 0.09 | | 33291 | 46.5 |
| Ex. 7 | | 1 | 4 | 4 | 1312 | 0.06 | 0.72 | 29909 | 50.2 |
| Ex. 8 | | 1 | 4 | 4.5 | 1400 | 0.04 | | 28377 | 52.0 |
| Ex. 9 | | 1 | 4 | 5 | 1051 | 0.03 | 0.66 | 23761 | 57.9 |
| Ex. 10 | | 1 | 4 | 5.5 | 1051 | 0.02 | | 27020 | 53.7 |
| Comp. Ex. 2 | Pyridine | 1 | 4 | 1 | 740.7 | 0.23 | 0.38 | 39147 | 40.6 |
| Comp. Ex. 3 | | 1 | 4 | 2 | — | — | — | — | — |
| Comp. Ex. 4 | Imidazole | 1 | 4 | 2 | 606 | 0.20 | 0.29 | 36259 | 43.4 |
| Comp. Ex. 5 | | 1 | 2 | 1 | 634 | 0.41 | 0.37 | 41525 | 38.4 |
| Comp. Ex. 6 | | 1 | 0.5 | 0.25 | 471 | 1.05 | 0.23 | 32360 | 47.5 |

As shown in Table 1, the conductive polymer films of Examples 1 to 10 each formed by adding pyridinium p-toluenesulfonate as the additive to the polymerization liquid each show a higher conductivity than that in Comparative Example 1 in which no additive is added. Comparative Example 2 in which pyridine used in the prior art was added instead of pyridinium p-toluenesulfonate to the polymerization liquid provided a conductivity of about 740 S/cm, but could not provide a conductivity of 750 S/cm or more in each example obtained by adding pyridinium p-toluenesulfonate.

It should be noted that, when the addition amount of pyridine as the additive was increased as compared to that in Comparative Example 2 like Comparative Example 3, the thickness of the conductive polymer film reduced to such an extent that the conductivity could not be measured. The reason for the foregoing is probably as described below. Because a basic additive such as pyridine directly acted on an oxidant such as ferric p-toluenesulfonate, the oxidizing ability of the oxidant reduced as the amount of the additive increased, and hence the polymerization reaction hardly occurred.

In addition, a conductivity of 750 S/cm or more in each example obtained by adding pyridinium p-toluenesulfonate could not be obtained for each of Comparative Examples 4 to 6 in each of which imidazole used in the prior art was added instead of pyridinium p-toluenesulfonate to the polymerization liquid.

monomer of 3 to 5 drastically increased a conductivity, and provided a higher conductivity of 1000 S/cm or more.

Figure 8:
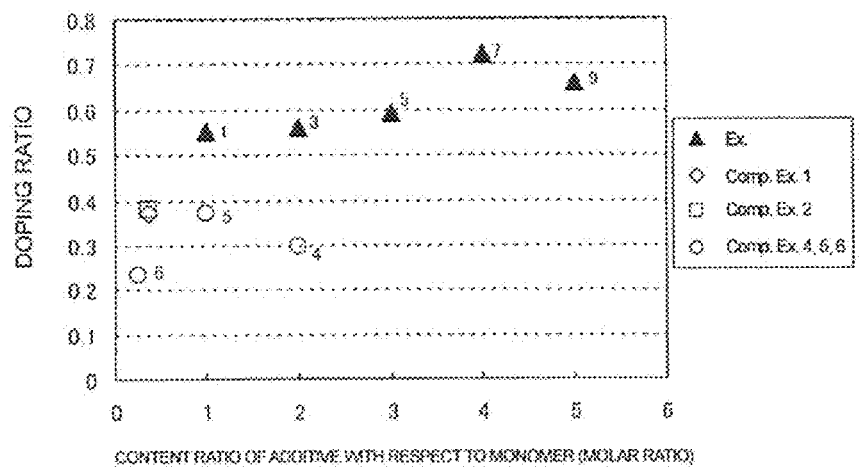
FIG. 8 is a view illustrating a relationship between the content ratio of an additive with respect to a monomer, and doping ratio, of each of conductive polymer films formed on glass substrates.

FIG. 8 is a view illustrating a relationship between the content ratio of an additive with respect to a monomer, and doping ratio, of each of the conductive polymer films of Examples 1, 3, 5, 7, and 9, and Comparative Examples 1, 2, 4, 5, and 6. The term "content ratio of an additive with respect to a monomer" as used herein refers to a molar ratio of the amount of an additive with respect to a monomer in the polymerization liquid. As illustrated in FIG. 8, a high doping ratio in excess of 0.5 like each example could not be obtained in Comparative Example 1 in which no additive was used and Comparative Examples 2, 4, 5, and 6 in each of which pyridine or imidazole was used as the additive even when the content ratio of the additive was changed. The reason for the foregoing is probably as described below. The additives in the examples each contain a dopant such as p-toluenesulfonic acid as a salt. In contrast, when no additive is used, or basic substances such as pyridine and imidazole are used as the additives like the comparative examples, a dopant is supplied by production from an oxidant through a polymerization reaction, and hence the amount of the dopant in the polymerization liquid is smaller than those in the examples. As a result, in each comparative example, the amount of the dopant included in the conductive polymer film is small, and hence the doping ratio does not become as large as that in any one of the examples.

As a result, in FIG. 7, the conductivity was not increased in each comparative example even when the content ratio of an additive with respect to a monomer was increased.

In addition, FIG. 9 is a view illustrating a relationship between the doping ratio and conductivity of each of the conductive polymer films of Examples 1, 3, 5, 7, and 9, and Comparative Examples 1, 2, 4, 5, and 6. The following tendency was observed. That is, the higher the doping ratio, the higher the conductivity. The reason for the foregoing is probably as described below. An increase in doping ratio led to an increase in content of p-toluenesulfonic acid as a dopant, and hence the carrier density increased and the conductivity proportional to the carrier density (conductivity $\sigma = en\mu$: elementary electric charge e, carrier density n, mobility $\mu$) increased. As can be seen from FIG. 9, the doping ratios of the conductive polymer films of the examples range from 0.55 or more to 0.72 or less higher than those in the comparative examples. As a result, the conductive polymer films of the examples each obtain a high conductivity of 750 S/cm or more.

Figure 10:
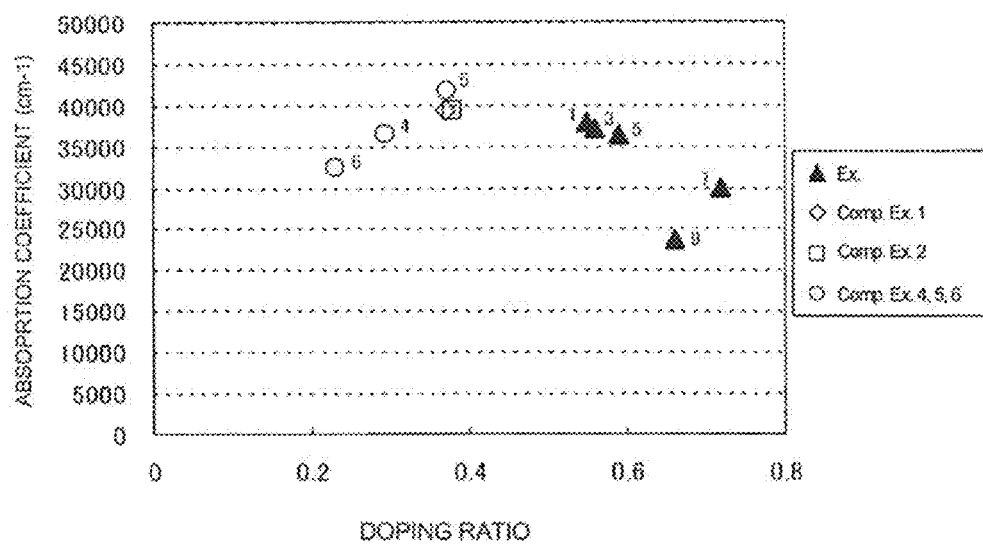
FIG. 10 is a view illustrating a relationship between the doping ratio and absorption coefficient (800 nm) of each of the conductive polymer films formed on the substrates.
Figure 11:
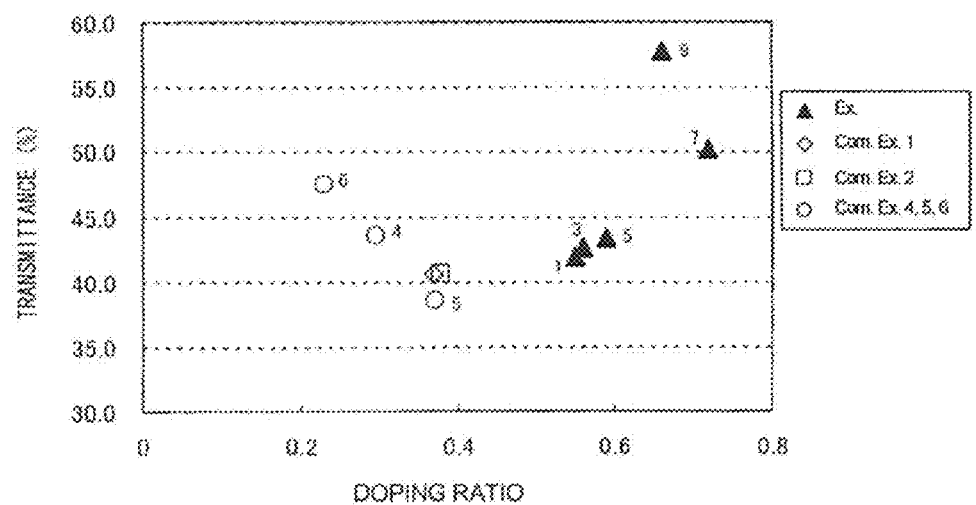
FIG. 11 is a view illustrating a relationship between the doping ratio and transmittance (800 nm) of each of the conductive polymer films formed on the glass substrates.

In addition, FIG. 10 is a view illustrating a relationship between the doping ratio, and absorption coefficient for light having a wavelength of 800 nm, of each of the conductive polymer films of Examples 1, 3, 5, 7, and 9, and Comparative Examples 1, 2, 4, 5, and 6, and FIG. 11 is a view illustrating a relationship between the doping ratio, and transmittance for light having a wavelength of 800 nm, of each of the conductive polymer films of Examples 1, 3, 5, 7, and 9, and Comparative Examples 1, 2, 4, 5, and 6. As illustrated in FIGS. 10 and 11, in each of Comparative Example 1, and Examples 1, 3, 5, 7, and 9, the absorption coefficient reduces and the transmittance increases with increasing doping ratio. In particular, as illustrated in FIG. 10, the absorption coefficient in Example 9 reduces by as high as about 40% as compared to that in Comparative Example 1. In addition, as illustrated in FIG. 11, comparison among the transmittances in Comparative Example 1, and Examples 7 and 9 show that the transmittance in each of Examples 7 and 9 in each of which the addition amount of the additive is 4 mol or more increases by 10% or more as compared to that in Comparative Example 1.

The reason for the foregoing is probably as described below. When polymerization was performed by adding a large amount of an additive, the crystallinity or orientation of a conductive polymer film reduced, and hence the amorphization of the conductive polymer film in which the transmittance generally increased in a polymer material proceeded.

As described above, in the case of each of the examples where the salts each formed of the dopant and the basic substance were used as additives, in the conductive polymer film having a high doping ratio and a high conductivity, an absorption coefficient for light having a wavelength of 800 nm is 38,000 cm$^{-1}$ or less can be obtained, and a light transmittance can also be increased.

On the other hand, when the basic substance was used as an additive as in each of Comparative Examples 2, 4, 5, and 6, the tendency contrary to that of each example was observed. In other words, the absorption coefficient increased and the transmittance reduced with increasing doping ratio, and hence a conductive polymer film having a high light transmittance could not be obtained at a high doping ratio.

Figure 12:
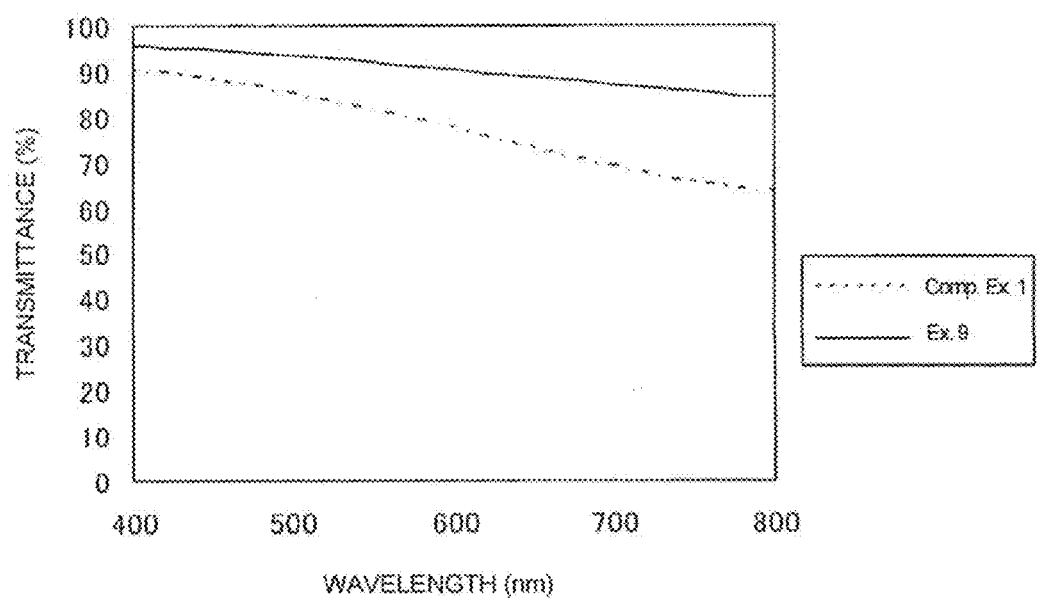
FIG. 12 is a view illustrating a relationship between the transmittance of each of the conductive polymer films formed on the glass substrates and a wavelength.

In addition, FIG. 12 is a view illustrating a relationship between the transmittance of each of the conductive polymer films of Example 9 and Comparative Example 1, and a wavelength. The conductive polymer film of Example 9 shows a higher transmittance than that of the conductive polymer film of Comparative Example 1 not only at a wavelength of 800 nm but also in a wide wavelength range.

It can be found that, when an additive formed of a salt is used as described above, an conductive polymer film having a high doping ratio that cannot have been conventionally obtained can be formed, and as shown in each of Examples 1 to 10, a conductive polymer film excellent in conductivity and having a high transmittance can be formed.

<Production and Evaluation of Solid Electrolytic Capacitor>

A solid electrolytic capacitor having a structure illustrated in FIG. 1 was produced. The anode 1 was formed of a sintered body of a tantalum (Ta) powder. The anode 1 had a rectangular parallelopiped shape measuring 2.3 mm by 1.8 mm by 1.0 mm. One terminal of the anode lead 7 stood from one end surface of the anode 1 having the rectangular parallelopiped shape. The anode lead 7 was formed of tantalum (Ta). The anode 1 in which the other terminal of the anode lead 7 was embedded was immersed in an aqueous solution of phosphoric acid, and was subjected to anodic oxidation by applying a predetermined voltage. The dielectric layer 2 formed of tantalum oxide was formed on the surface of the anode 1 by the anodic oxidation. As described above, the dielectric layer 2 was formed on the surfaces of the holes of the porous body of which the anode 1 was formed as well.

Next, the anode 1 covered with the dielectric layer 2 was immersed in a polymerization liquid. Used as the polymerization liquid was a butanol solution in which 3,4-ethylenedioxythiophene as a monomer for a conductive polymer, ferric p-toluenesulfonate as an oxidant, and pyridinium p-toluenesulfonate as an additive were mixed at a molar ratio of 1:4:4. The anode 1 on which the dielectric layer 2 was formed was immersed in the polymerization liquid, and was lifted and dried after the immersion. Thus, a conductive polymer film was formed on the dielectric layer 2. The immersion in the polymerization liquid and the drying were repeated so that the thickness of the conductive polymer film might be increased and adjusted. Thus, the conductive polymer layer 3 having a thickness of 50 µm was formed.

After that, the carbon layer 4 and the silver paste layer 5 were sequentially formed on the conductive polymer layer 3 on the outer peripheral surface of the anode 1 so that the cathode layer 6 might be provided. An anode terminal was welded to the anode lead 7 of the solid electrolytic capacitor 8 thus produced, and a cathode terminal was connected to the cathode layer 6 of the capacitor with a conductive adhesive. After that, the external of the solid electrolytic capacitor 8 was armored with an epoxy resin so as to be coated and hermetically sealed. Thus, a solid electrolytic capacitor was completed. The ESR of the resultant solid electrolytic capacitor was measured. The measurement of the ESR was performed with the LCR meter at a frequency of 100 kHz. As a result of such measurement as described above, the ESR was 6.2 mΩ.

In contrast, a conductive polymer film was formed for comparison in the same manner as in the foregoing except that pyridine as an additive was added to the polymerization liquid in the above example. Thus, a solid electrolytic capacitor for comparison was produced. The ESR of the solid electrolytic capacitor for comparison was measured in the same manner as in the foregoing. As a result, the ESR was 6.7 mΩ. As described above, the formation of the conductive polymer layer in the solid electrolytic capacitor in accordance with the present invention was able to increase the conductivity of the conductive polymer layer 3, and as a result, was able to reduce the ESR of the solid electrolytic capacitor.

<Production and Evaluation of Organic Solar Cell>

An organic solar cell having a structure illustrated in FIG. 2 was produced.

First, the hole-transporting layer 12 formed of a conductive polymer layer was formed on the surface of the transparent electrode 11 formed of an ITO by the following process. In other words, a polymerization liquid formed of a butanol solution in which 3,4-ethylenedioxythiophene as a monomer for a conductive polymer, ferric p-toluenesulfonate as an oxidant, and pyridinium p-toluenesulfonate as an additive were mixed at a molar ratio of 1:4:4 was applied to the transparent electrode 11 by spin coating.

After that, the applied polymerization liquid was left to stand at 50° C. for 1 hour, washed with pure water, and dried. Thus, the hole-transporting layer 12 was formed. As a result, the hole-transporting layer 12 formed of a thin film of polyethylenedioxythiophene having a thickness of 50 nm was formed.

Next, a solution of poly(3-hexylthiophene) in o-dichlorobenzene was applied onto the hole-transporting layer 12 by spin coating. Thus, the active layer 13 having a thickness of 50 nm was formed. A $C_{60}$ fullerene film was deposited from the vapor onto the active layer 13 in a vacuum. Thus, the electron-transporting layer 14 having a thickness of 50 nm was formed.

After that, a film formed of aluminum was deposited from the vapor onto the electron-transporting layer 14 in a vacuum with a shadow mask. Thus, the upper electrode 15 was formed. Next, the resultant was sealed with a glass cap. Thus, the organic solar cell 16 was completed.

The organic solar cell thus produced was irradiated with pseudo sunlight having an air mass (AM) of 1.5 (100 mW/cm$^2$). As a result, it was able to obtain an electromotive force of 555 my as an open-circuit voltage. The hole-transporting layer 12 was formed for comparison in the same manner as in the foregoing except that pyridine was added as an additive to the polymerization liquid in the above example. Thus, an organic solar cell for comparison was produced.

The organic solar cell for comparison was irradiated with pseudo sunlight in the same manner as in the foregoing. As a result, an electromotive force of 520 mV was obtained as an open-circuit voltage. It was able to observe an increase in electromotive force by the present invention with the foregoing results. In other words, it was able to observe an increase in electromotive force by such action and effect that the use of the conductive polymer film according to the present invention as the hole-transporting layer 12 improved the conductivity of the hole-transporting layer 12 and reduced an IR drop resulting from an interface resistance and a bulk resistance, and hence an open-circuit voltage increased.

<Production and Evaluation of Silicon-Based Solar Cell>

A silicon-based solar cell having a structure illustrated in FIG. 3 was produced.

First, a texture structure was formed on the surface of the n-type single-crystal silicon substrate 20 for improving the efficiency with which light was utilized. The texture structure was formed by immersing the silicon substrate 20 in, for example, an aqueous solution of NaOH (about 1.5 wt %) kept at a temperature of about 85° C. for about 30 minutes to perform anisotropic etching. The texture structure is a structure having a height of several micrometers to several tens of micrometers in the direction perpendicular to the light-receiving surface.

Next, the i-type amorphous silicon layer 21 and the n-type amorphous silicon layer 22 were formed in the stated order on the rear surface of the n-type single-crystal silicon substrate 20 by employing a chemical vapor deposition (CVD) method. Subsequently, the i-type amorphous silicon layer 23 and the p-type amorphous silicon layer 24 were formed in the stated order on the light-receiving surface of the n-type single-crystal silicon substrate 20 by employing the CVD method. The respective amorphous silicon layers 21 to 24 each have a thickness of about 5 nm.

Next, the conductive polymer film 25 of the present invention was formed as a transparent electrode on the p-type amorphous silicon layer 24 on the light-receiving surface. To be specific, a polymerization liquid was prepared by mixing 3,4-ethylenedioxythiophene as a precursor monomer for a conductive polymer, a 40-wt % solution of ferric p-toluenesulfonate as an oxidant in butanol, and pyridinium p-toluenesulfonate as an additive at a molar ratio of 1:4:4. A film was formed by applying the resultant polymerization liquid onto the p-type amorphous silicon layer 24 by a spin coating method. After having been formed, the film was baked at 50° C. for 1 hour. After having been left to stand, the film was subjected to washing and drying steps. Thus, the conductive polymer film 25 was formed. The conductive polymer film 25 has a thickness of about 60 nm.

Next, a thin film layer of an indium tin oxide was formed as the buffer layer 26 on the conductive polymer film 25 by a sputtering method. The buffer layer 26 had a thickness of about 30 nm. In addition, an indium tin oxide was similarly formed into a film having a thickness of about 30 nm as the rear surface electrode layer 2'7 on the n-type amorphous silicon layer 22 on the rear surface side by the sputtering method.

Next, the light-receiving surface side collecting electrodes 28 were formed on the buffer layer 26 on the light-receiving surface side, and the rear surface side collecting electrodes 29 were formed on the rear surface electrode layer 27.

The photoelectric conversion characteristic of the silicon-based solar cell 30 (FIG. 3) thus completed was measured with a solar simulator. As a result, a solar cell having an open-circuit voltage (Voc) of 0.68 V, a short-circuit current (Isc) of 36 mA/cm$^2$, and a conversion efficiency of 17.0% was obtained, and it was confirmed that the conductive polymer film according to the present invention functioned sufficiently as a transparent conductive film for a solar cell.

<Production and Evaluation of Transparent Conductive Substrate>

A transparent conductive substrate having a structure illustrated in FIG. 4 was produced.

A polymerization liquid was prepared by mixing 3,4-ethylenedioxythiophene as a precursor monomer for a conductive polymer, a 40-wt % solution of ferric p-toluenesulfonate as an oxidant in butanol, and pyridinium p-toluenesulfonate as an additive at a molar ratio of 1:4:5. A film was formed by applying the resultant polymerization liquid onto a polyethersulfone (PES) substrate by a spin coating method. After having been formed, the film was left to stand at 50° C. for 1 hour. After having been left to stand, the film was washed with pure water so that a by-product might be removed. Thus, a conductive polymer film was formed on the substrate.

The resultant conductive polymer film had a sheet resistance of 200Ω/□ and a transmittance of 90%. The transmittance was calculated by averaging transmittances for light having a wavelength of 400 nm to 800 nm. A film was formed for comparison without using any additive in the above example. The formation was performed in the same manner as in the foregoing except that no additive was used. The sheet resistance and transmittance of the transparent conductive film for comparison were measured. As a result, the film had a sheet resistance of 305Ω/□ and a transmittance of 77%. The foregoing results showed that the formation of a conductive polymer film in accordance with the present invention was able to provide a transparent conductive film having a low sheet resistance and a high transmittance.

What is claimed is:

1. A conductive polymer film obtained by polymerizing a monomer for a conductive polymer with a polymerization liquid containing the monomer for a conductive polymer, an oxidant, and an additive at a molar content ratio with respect to monomer between two and five, wherein the additive comprises a salt formed of a dopant and a basic substance represented by the following formula:

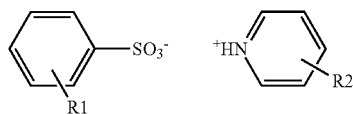

wherein R1 and R2 are selected from the group consisting of an alkyl group represented by CnH(2n+1), an alkoxy group represented by CnH(2n+1)O, a carboxylate group, a hydroxy group, an amino group, a nitro group, an allyl group and an aryl group and wherein each of the benzene ring and pyridine ring may be multi-substituted bodies having a plurality of R1 or R2.

2. A conductive polymer film according to claim 1, wherein the absorption coefficient of the conductive polymer film for light having a wavelength of 800 nm comprises 38,000 cm$^{-1}$ or less.

3. An electronic device comprising the conductive polymer film according to claim 2.

4. An electronic device according to claim 3, wherein the electronic device comprises a solid electrolytic capacitor.

5. A conductive polymer film according to claim 1, wherein the additive is pyridinium p-toluenesulfonate.

6. An electronic device comprising the conductive polymer film according to claim 1.

7. An electronic device according to claim 6, wherein the electronic device comprises a solid electrolytic capacitor.

8. A method of producing a conductive polymer film, the method comprising:
    applying, onto a substrate, a polymerization liquid containing a monomer for a conductive polymer, an oxidant, and an additive at a molar content ratio with respect to monomer between two and five as a salt formed of a dopant and a basic substance represented by the following formula:

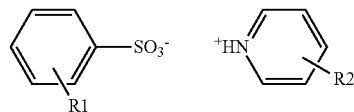

wherein R1 and R2 are selected from the group consisting of an alkyl group represented by CnH(2n+1), an alkoxy group represented by CnH(2n+1)O, a carboxylate group, a hydroxy group, an amino group, a nitro group, an allyl group and an aryl group and wherein each of the benzene ring and pyridine ring may be multi-substituted bodies having a plurality of R1 or R2; and
    polymerizing the monomer for a conductive polymer on the substrate.

9. A method of producing a conductive polymer film according to claim 8, wherein the additive is pyridinium p-toluenesulfonate.

10. A method of producing an electronic device in which a conductive polymer film is formed, the method comprising:
    applying, onto a substrate, a polymerization liquid containing a monomer for a conductive polymer, an oxidant, and an additive at a molar content ratio with respect to monomer between two and five as a salt formed of a dopant and a basic substance represented by the following formula:

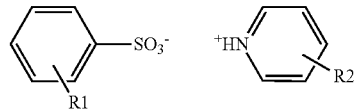

wherein R1 and R2 are selected from the group consisting of an alkyl group represented by CnH(2n+1), an alkoxy group represented by CnH(2n+1)O, a carboxylate group, a hydroxy group, an amino group, a nitro group, an allyl group and an aryl group and wherein each of the benzene ring and pyridine ring may be multi-substituted bodies having a plurality of R1 or R2; and
    polymerizing the monomer for a conductive polymer on the substrate to form the conductive polymer film.

11. A method of producing an electronic device according to claim 10, wherein the additive is pyridinium p-toluenesulfonate.

* * * * *